United States Patent [19]

Schueman

[11] Patent Number: 5,460,237
[45] Date of Patent: Oct. 24, 1995

[54] AIR POWERED ACTUATOR FOR RETRACTING THE LOCKING PINS OF A SLIDER

[75] Inventor: Gerald L. Schueman, Oakland, Iowa

[73] Assignee: Schueman Transfer, Inc., Oakland, Iowa

[21] Appl. No.: 243,984

[22] Filed: May 17, 1994

Related U.S. Application Data

[63] Continuation-in-part of Ser. No. 195,852, Feb. 10, 1994.

[51] Int. Cl.⁶ .................................................. B62D 61/12
[52] U.S. Cl. ................................. 180/209; 280/149.2
[58] Field of Search ........................... 180/209, 24.01, 180/24.02; 280/149.2, 405.1

[56] References Cited

U.S. PATENT DOCUMENTS

| | | | |
|---|---|---|---|
| 2,935,332 | 5/1960 | DeLay | 280/81 |
| 2,976,051 | 3/1961 | Morey | 280/81 |
| 3,146,000 | 8/1964 | Holzman | 280/81 |
| 3,365,211 | 1/1968 | Ginsburg | 280/81 |
| 3,372,946 | 3/1968 | Hutchens | 280/81 |
| 3,778,079 | 12/1973 | Vornberger et al. | 280/80 B |
| 4,635,742 | 1/1987 | Bertolini | 180/209 |
| 4,838,566 | 6/1989 | Baxter et al. | 280/149.2 |
| 4,838,578 | 6/1989 | Baxter | 280/149.2 |
| 4,944,522 | 7/1990 | Hart | 280/149.2 |
| 4,993,737 | 2/1991 | Torcomian | 280/149.2 |
| 5,199,732 | 4/1993 | Lands et al. | 180/209 X |
| 5,232,234 | 8/1993 | McCombs | 280/149.2 X |
| 5,314,201 | 5/1994 | Wessels | 180/209 X |
| 5,346,233 | 9/1994 | Moser | 280/149.2 |

*Primary Examiner*—Margaret A. Focarino
*Assistant Examiner*—Christopher Ellis
*Attorney, Agent, or Firm*—Zarley, McKee, Thomte, Voorhees & Sease; Dennis L. Thomte

[57] ABSTRACT

An air powered actuator is provided for exerting sufficient force on the locking pins of a slider for the adjustment of the suspension of a vehicle longitudinally with respect to the body of the vehicle. The air powered actuator is controlled from the cab of the vehicle. A signal light is illuminated when the locking pins of the slider have been completely retracted. A position sensor is provided which deactivates the signal light each time the trailer is moved a predetermined amount with respect to the slider.

6 Claims, 6 Drawing Sheets

AIR POWERED ACTUATOR FOR RETRACTING THE LOCKING PINS OF A SLIDER

CROSS-REFERENCE TO RELATED APPLICATION

This is a continuation-in-part application of application Ser. No. 08/195,852 filed Feb. 10, 1994, entitled "AN AIR POWERED ACTUATOR FOR RETRACTING THE LOCKING PINS OF A SLIDER".

BACKGROUND OF THE INVENTION

1. Field of the Invention

This invention relates generally to a slider which is used to adjust the suspension of a vehicle longitudinally with respect to the body of the vehicle, and more particularly to an air powered actuator for retracting the locking pins of the slider.

2. Background of the Invention

Sliders are commonly used to enable longitudinal adjustment of the suspension of a tandem axle trailer relative to the van or body of the trailer. Conventional sliders normally comprise a pair of side rails which are secured to the left and right sides of the van and which extend longitudinally therealong the underside thereof. The suspension of the trailer is carried by a frame which includes left and right slide members which are slidably mounted with respect to the side rails of the van. A plurality of locking pins lock the frame in various positions with respect to the side rails. When it is desired to adjust the suspension of the trailer with respect to the body, the locking pins are retracted to permit the frame to slide with respect to the side rails of the van. However, if the vehicle is not sitting on perfectly level ground, the locking pins may be difficult to pull from their registering openings in the frame and the side rails of the body. Heretofore, the normal procedure for freeing the locking pins was to have one person pull on the actuating arm connected to the locking pins while the driver attempted to jiggle or jog the trailer with respect to the tandem axle, which had been previously locked in place with the air powered emergency brake. The above solution was not satisfactory and an effort to solve the problem is disclosed in U.S. Pat. No. 4,838,566. Although it is believed that the device of the '566 patent makes the problem described above easier to solve, it is still believed that the device disclosed in the '566 patent does not completely solve the problems of retracting the locking pins from their registering openings in the frame and the side rails of the trailer.

The invention disclosed in the co-pending application represented a significant advance in the art. However, the invention described in the co-pending application did not include any means which would indicate to the vehicle operator that the locking pins had been completely retracted. Further, the invention of the co-pending application did not include any means for indicating the relative position of the vehicle body with respect to the vehicle suspension as the vehicle body is being moved with respect to the vehicle suspension.

SUMMARY OF THE INVENTION

The invention described herein is an improvement over the slider of U.S. Pat. No. 4,838,566 in that an air powered actuator is operatively connected to the locking pin interconnects so that air pressure may be utilized to pull the locking pins from their registering openings in the frame and the side rails of the trailer. In operation, when it is desired to longitudinally adjust the suspension of the trailer with respect to the trailer body, the emergency brake for the tandem axle is first set or activated. The air powered actuator is then actuated which exerts sufficient retracting force on the locking pins to pull the locking pins from their registering openings in the frame and the side rails of the trailer.

In the invention described herein, a light is positioned either at the side of the vehicle body or at some other convenient location which is visible to the vehicle operator during the adjustment of the vehicle body with respect to the vehicle suspension. The light is controlled by a switch mounted on the slider which is actuated only when the locking pins have been fully moved to their retracted positions to indicate to the operator that the locking pins are in their retracted positions. Further, the instant invention includes means which deactivates the signal light at the side of the trailer each time the vehicle body is moved a predetermined amount with respect to the vehicle suspension during the adjustment process so that the operator will be able to ascertain the location of the trailer with respect to the suspension.

It is therefore a principal object of the invention to provide an improved slider for adjustment of the suspension of a trailer longitudinally with respect to the body of the trailer.

A further object of the invention is to provide an air powered actuator for retracting the locking pins of a slider.

A further object of the invention is to provide an invention of the type described above which may be easily connected to the conventional slider adjustment actuator without extensive modification thereof.

Still another object of the invention is to provide a device of the type described above which is safe to use.

Still another object of the invention is to provide a device of the type described above which is convenient to use.

Still another object of the invention is to provide an invention of the type described above which is economical of manufacture and easy to install.

Yet another object of the invention is to provide an invention of the type described above which includes a signal means which is actuated only when the locking pins of the slider have been fully retracted.

Still another object of the invention is to provide an invention of the type described above including a signal means which is successively actuated upon predetermined movement of the vehicle body with respect to the vehicle suspension during the adjustment procedure.

These and other objects will be apparent to those skilled in the art.

DESCRIPTION OF THE PREFERRED EMBODIMENT

Figure 1:
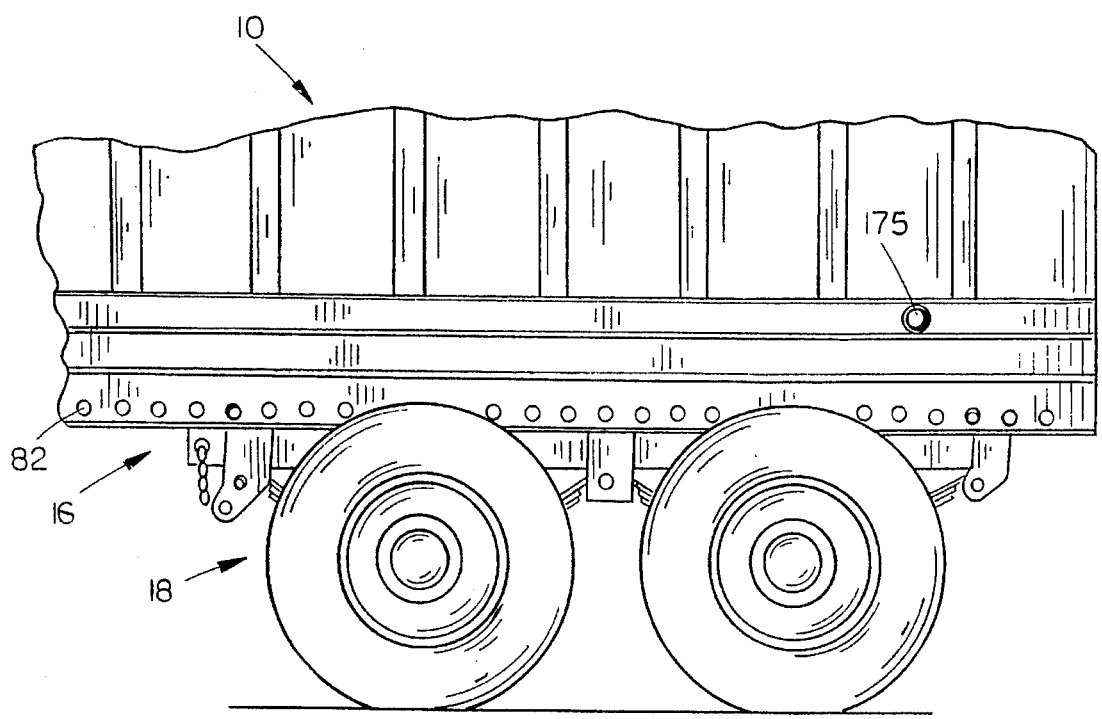
FIG. 1 is a partial side view of the suspension system of a trailer having a tandem axle.
Figure 2:
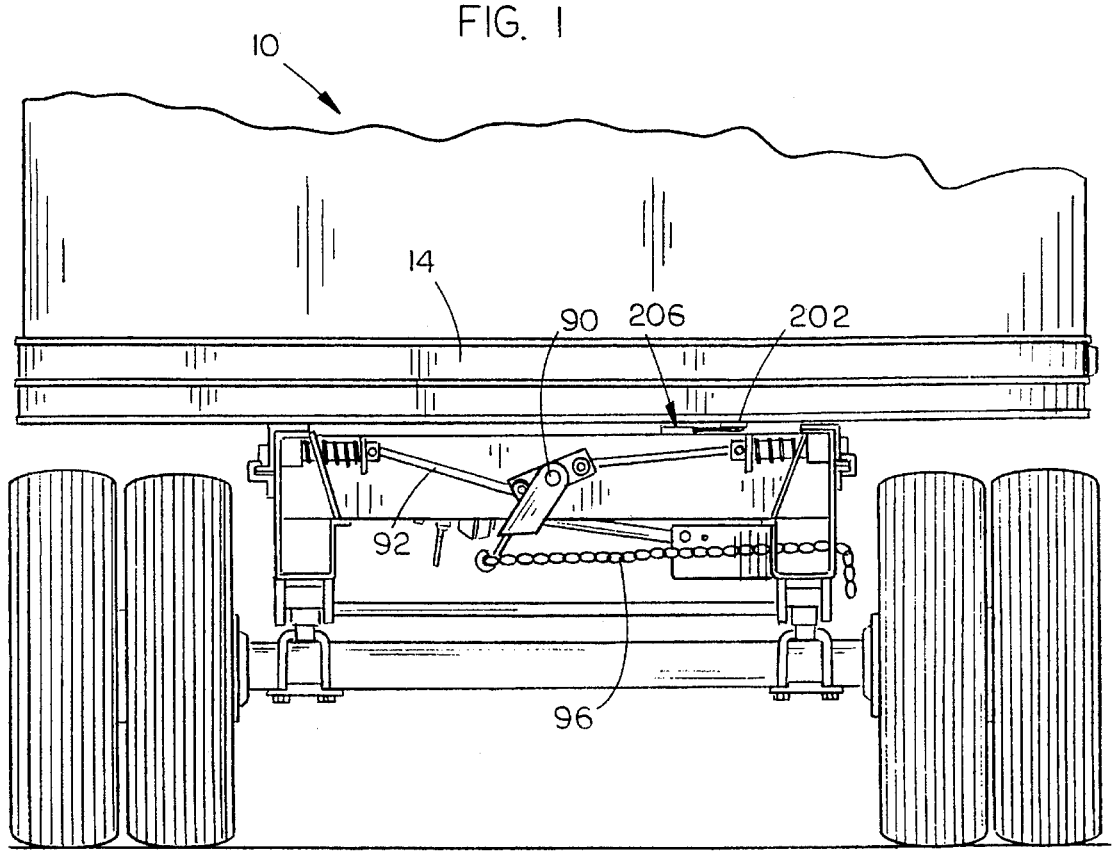
FIG. 2 is a front view of the trailer of FIG. 1.
Figure 3:
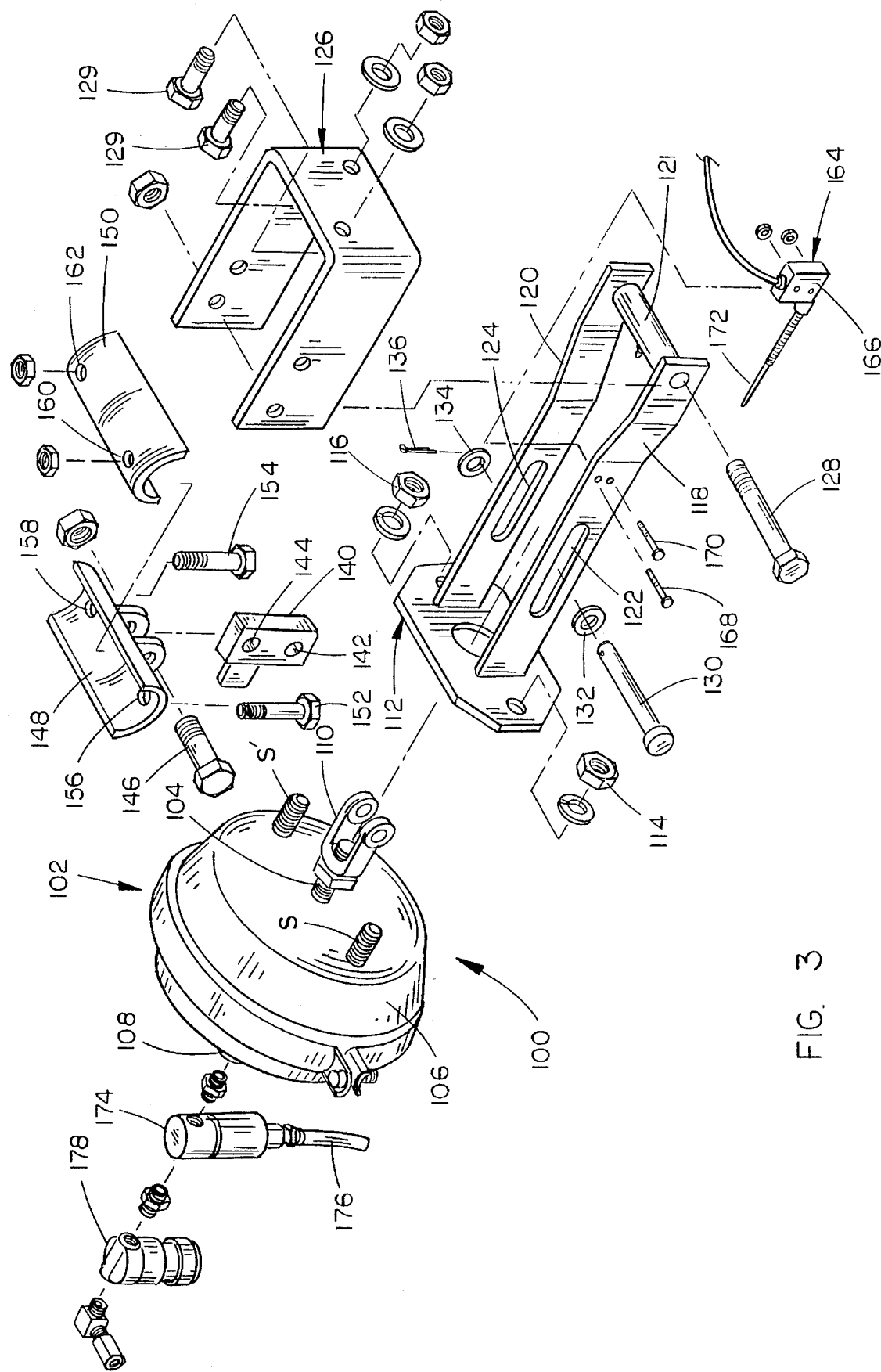
FIG. 3 is an exploded perspective view of the air powered actuator of this invention.

The numeral 10 refers generally to a trailer which is conventionally pulled by a truck or tractor having a fifth wheel connection thereto. Trailer 10 includes a frame 12 having a plurality of transversely extending cross frame members 14 extending between the sides thereof. A slider 16, such as disclosed in U.S. Pat. No. 4,838,566, is secured to the underside of the cross frame members 14 near the rear end of the trailer 10. The numeral 18 refers to a tandem axle suspension which is operatively connected to the slider 16 for movement longitudinally therewith with respect to the trailer 10.

Figure 5:
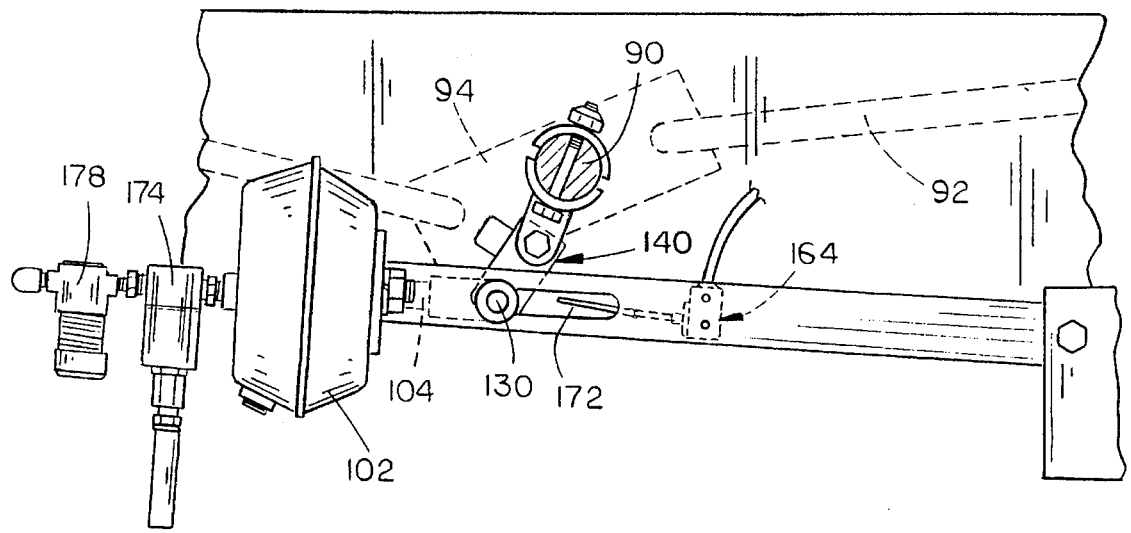
FIG. 5 is a front view of the air powered actuator of this invention which illustrates the air powered actuator in its non-actuating position.

Slider 16 includes a pair of side rails 20 and 22 which are secured to the underside of the cross frame members 14. Side rail 20 is generally Z-shaped and includes a top flange 24, bottom flange 26 and a substantially vertically disposed web 28 interconnecting flanges 24 and 26. As seen in FIG. 5, side rail 22 includes top flange 30, bottom flange 32 and a substantially vertically disposed web 34 which interconnects the flanges 30 and 32.

Figure 4:
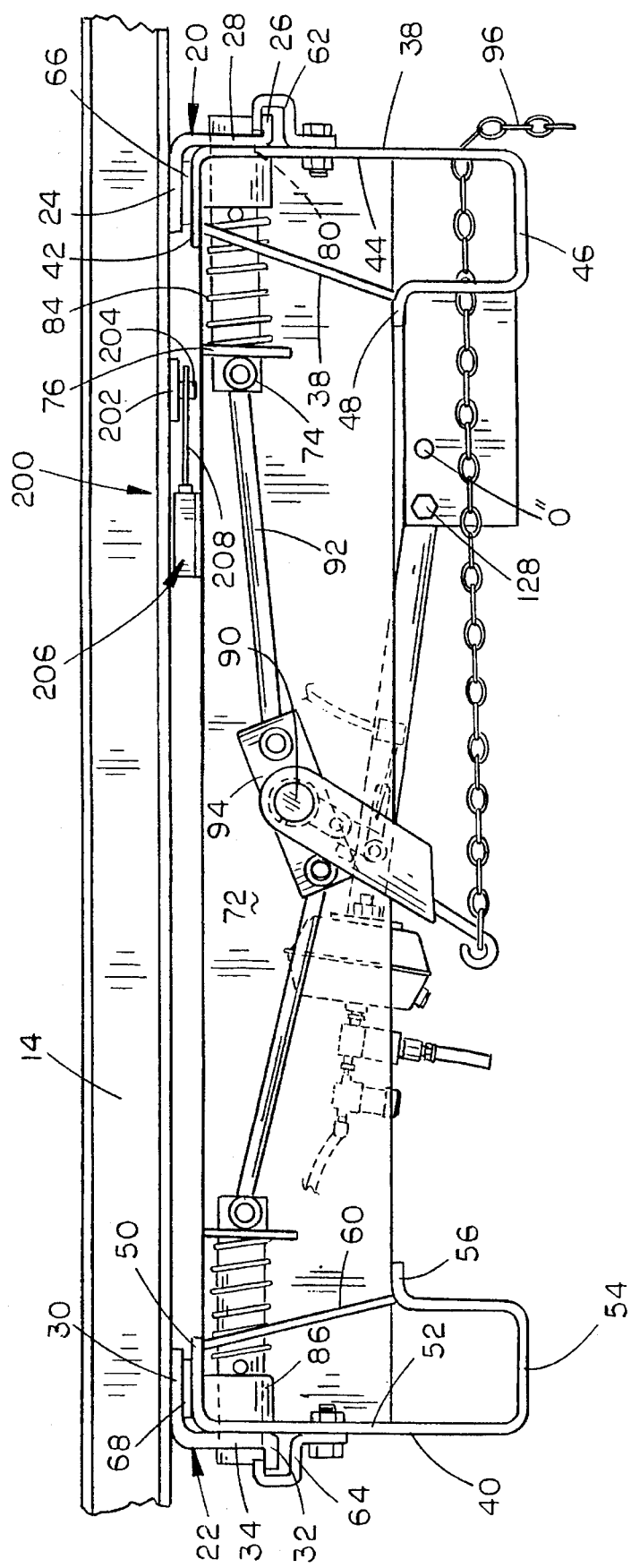
FIG. 4 is a front view of the slider adjustment assembly and the air powered actuator of this invention.
Figure 7:
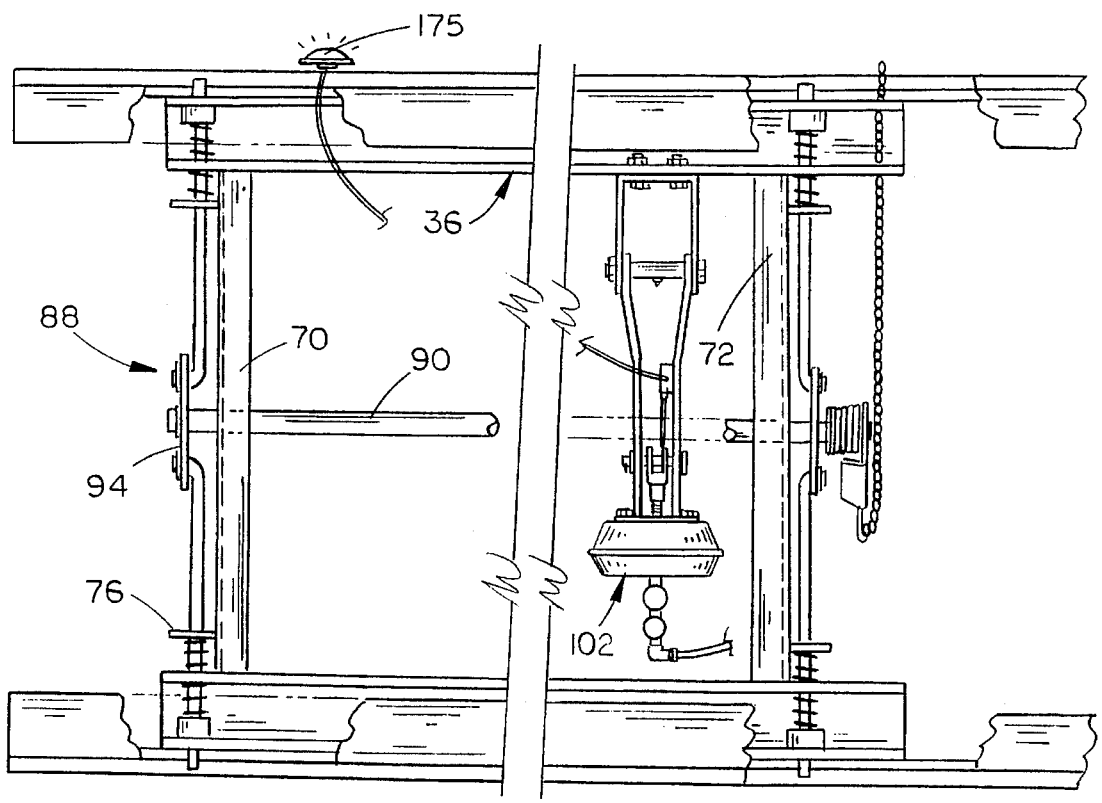
FIG. 7 is a partial top view of the air powered actuator of this invention and its relationship with respect to the slider assembly.

Slider 16 also includes a rectangular frame, generally designated by the reference numeral 36 in FIG. 7, which carries the suspension of the tandem axle and which includes left and right slide members 38 and 40. The slide members 38 and 40 are slidable longitudinally of the van or trailer on the side rails 20 and 22. As is best illustrated in FIG. 4, each of the slide members 38 and 40 are of generally G-shaped in section. Slide member 38 includes an upper inwardly-directed horizontal flange 42 spaced below the upper flange 24 of the side rail 20, a generally vertical side wall 44 disposed inwardly of the web 28 of a side rail, a lower inwardly directed horizontal flange 46, and a lip 48 bent inwardly from the inner end of the lower flange 46. Similarly, slide member 40 has an upper inwardly-directed horizontal flange 50 spaced below the upper flange 30 of side rail 22, a generally vertical side wall 52 disposed inwardly of the web 34 of the side rail 22, a lower inwardly-directed horizontal flange 54, and a lip 56 bent inwardly from the inner end of the lower flange 54. Slide members 38 and 40 are provided with upright reinforcing gussets 58 and 60 respectively, the end result being that each slide member 38 and 40 is a hollow-beam member.

A plurality of hook-shaped sliders 62 are secured to the side wall 44 of the slide member 38 and overlie the lower flange 26 of the side rail 20 as illustrated in FIG. 4. A plurality of hook-shaped sliders 64 are secured to the side wall 52 of the slide member 40 and overlie the lower flange 32 of the side rail 22. The hook-shaped sliders 62 and 64 permit the frame 36 of the slider 16, carrying the suspension, to be slidably longitudinally adjusted relative to the side rails 20 and 22. Pad 66 is provided between the upper flange 42 of slide member 38 and the upper flange 24 of side rail 20 to ensure a relatively close sliding fit between the two members. A pad 68 is provided between the upper flange 50 of slide member 40 and the flange 30 of side rail 22 to also ensure a relatively close sliding fit between the two members. Cross beams 70 and 72 are secured to and extend between the slide members 38 and 40 and extend therebetween. In particular, the cross beams 70 and 72 are secured to the gusset plates 58 and 60.

A plurality of locking pins, each designated with the reference numeral 74 are provided for locking the frame 36 in various positions of adjustment relative to the side rails 20 and 22. Four such pins are illustrated in FIG. 7, two at the front of the slider 16, adjacent opposite slide members 38 and 40, and two at the rear of the slider adjacent opposite slide members 38 and 40. The locking pins 74 are supported by mounting plates 76 secured to the cross beams 70 and 72 for horizontal linear movement in a direction generally transverse to the trailer and are conjointly retractable for permitting adjustment of the frame 36 to various positions of adjustment relative to the side rails 20 and 22 and extensible for locking the frame 36 in a selected position of adjustment. When a pin 74 is in its extended position, it extends through an opening in gusset 58 and through an opening 80 in the respective side wall of the respective slide member 38 or 40. Locking pin 74, when in its extended position, also extends through one of a series of openings 82 in the web of the respective slide member 38 or 40. The openings 82 are spaced at regular intervals to provide the necessary adjustment. Each pin 74 is biased towards its extended position by means of a spring 84 disposed between the mounting plate 76 and a radial flange 86 around the pin towards its outer end.

The locking pins 74 are conjointly movable between extended and retracted positions by means of linkage generally indicated at 88 interconnecting the pins. The linkage 88 comprises a shaft 90 extending longitudinally of the frame generally parallel to the slide members 38 and 40 and approximately midway therebetween. As illustrated in FIG. 7, shaft 90 is journaled in cross frame members 70 and 72 for rotation as will be described hereinafter. A plurality of links 92, one for each locking pin 74, interconnect shaft 90 and the pins 74. As illustrated in FIG. 4, the inner ends of the links 92 connecting the two locking pins 74 at the rear of the slider are pivotally connected to opposite ends of plate 94 which is secured to the shaft 90, and the outer ends of these links are pivotally connected to their respective pins 74. Thus, when shaft 90 is rotated in a first direction, the links 92 will pull the pins 74 from their extended positions to their retracted positions. Conversely, when the shaft 90 is rotated in a direction opposite to that just described, the links 92 will move the pins 74 towards their extended positions. The springs 84 on the locking pins 74 urge the locking pins 74 to their extended positions.

An actuating chain 96 is provided for conventionally rotating the shaft 90 thereby affecting articulation of the links 92 to retract the locking pins 74. In U.S. Pat. No. 4,838,566, the chain 96 is in the form of a rod. The chain 96 extends generally transversely with respect to the trailer and laterally outwardly through the slide member 38. A spring-loaded linkage 98 interconnects the inner end of the chain 96 and the shaft 90 for a purpose which is described in U.S. Pat. No. 4,838,566. It should be noted, that all of the structure previously described is conventional structure, except for chain 96 being substituted for a pull rod, which is disclosed in U.S. Pat. No. 4,838,566. It is the structure described above which applicant believes does not perform satisfactorily thereby necessitating the means of this invention to power rotate the shaft 90 to positively cause the retraction of the locking pins 74.

For purposes of description, the air powered actuator of this invention is referred to generally by the reference numeral 100. It should be noted that although the air powered actuator 100, which will now be described, is ideally suited for use with the slider described in U.S. Pat. No. 4,838,566, the air powered actuator 100 of this invention may be easily adapted for use with any slider employing retractable locking pins. For example, the air powered actuator of this invention could easily be modified to operate the locking pins disclosed in U.S. Pat. Nos. 2,935,332; 2,978,051; 3,146,000; 3,365,211; 3,372,946; 3,778,079; or 4,838,578.

Air powered actuator 100 includes a pressure cylinder or canister 102 of conventional design having a rod 104 extending from one side of the housing 106. Threaded studs S and S' extend from one side of housing 106. Housing 106 has an air inlet 108 which is connected to a source of air under pressure as will be described hereinafter. When air under pressure is supplied to the housing 106, the rod 104 is extended therefrom in conventional fashion. Preferably, the pressure cylinder 102 is of the type which is normally associated with vehicle air brakes. Although it is preferred that the pressure cylinder or air brake 102 be utilized, the pressure cylinder 102 could be replaced by any suitable fluid cylinder, fluid motor, etc., wherein a movable rod, similar to rod 104, extends therefrom when air or fluid pressure is supplied to the device.

Rod 104 has a clevis 110 mounted thereon which extends through bracket 112 which is secured to the studs S and S' of housing 106 by nuts 114 and 116. Bracket 112 includes a pair of spaced-apart arms 118 and 120 having elongated slots 122 and 124 formed therein respectively. The outer ends of the arms 118 and 120 have a bushing 121 which receives a bolt 128 to pivotally secure the bracket 112 to bracket 126. Bracket 126 is secured to the slide member 38 by bolts 129. Bushing 121 may either be positioned in alignment with the openings 0' or the openings 0" to permit the actuator to be mounted on various sizes of equipment.

Pin 130 is slidably received in the slots 122 and 124 and is maintained therein by means of the washers 132 and 134 positioned on the outer ends thereof outwardly of the arms 118 and 120. Retaining key 136 is received in one end of the pin 130 to maintain the washer 134 on the pin 130.

Link 140 is provided which has an opening 142 at one end thereof which rotatably receives the pin 130. As seen in the drawings, link 140 is rotatably mounted on the pin 130 between the arms 118 and 120. Link 140 is provided with an opening 144 at its other end which receives a bolt 146 to enable link 140 to be pivotally secured to a semi-circular bracket member 148. A semi-circular bracket member 150 is adapted to be secured to the bracket member 148 by means of the bolts 152 and 154 extending through openings 156 and 158 in bracket member 148 and openings 160 and 162 in bracket member 150. Bracket members 148 and 150 are adapted to be secured to the shaft 90 which will have been drilled to provide a pair of openings extending therethrough so that the bolts 152 and 154 may be extended therethrough.

Figure 6:
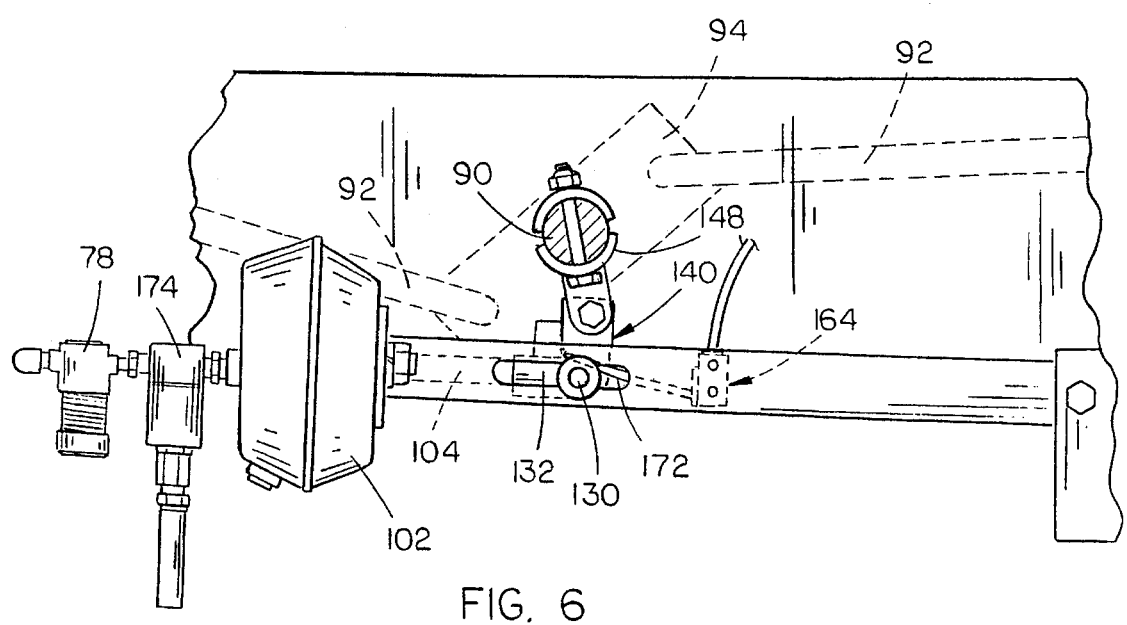
FIG. 6 is a view similar to FIG. 5 except that the air powered actuator has been actuated.

The numeral 164 refers to a microswitch having a housing 166 which is secured to arm 118 by means of bolts 168 and 170. Microswitch 164 includes a switch arm 172 extending therefrom which is in the movable path of the pin 130 as illustrated in FIGS. 5 and 6. When the air actuator is actuated and the pin 130 moves outwardly in the slots 122 and 124, which means that the locking pins have been fully retracted, the light 175 at the side of the vehicle, or other convenient location, will be illuminated as will be described in more detail hereinafter to indicate to the driver that the locking pins have been fully retracted.

FIG. 5 illustrates the rod 104 of cylinder 102 in its normal retracted position. With the rod 104 in the retracted position, the links 92 are in the position so that the locking pins 74 are in their locked or extended position. When it is desired to retract the locking pins 74 to enable the suspension of the trailer to be longitudinally moved with respect to the body of the trailer, air is supplied to cylinder 102 so that rod 104 is extended therefrom. As rod 104 is extended from the cylinder 102, pin 130 is moved laterally outwardly in the slots 122 and 124. The outward movement of the pin 130 in the slots 122 and 124 causes the link 140 to be pivoted which in turn causes the bracket 148 to be pivoted which causes the shaft 90 to be rotated from the position of FIG. 5 to the position of FIG. 6. The rotational movement of the shaft 90 causes the plate 94 to be rotated which causes the links 92 to retract the locking pins 74.

In the event that the locking pins 74 are stuck in their respective openings, due to some binding force thereon, the rod 104 may not be able to be extended by the pressure exerted in the pressure cylinder 102. However, with air pressure being maintained in the cylinder 102, outward force or pressure is applied to the rod 104. The operator of the vehicle then slightly "jogs", "jiggles" or moves the trailer with respect to the tandem axle suspension. As soon as the trailer has been sufficiently moved to relieve the binding forces on the locking pins 74, the outward pressure being exerted on the rod 104 will cause the shaft 90 to be rotated so that the locking pins 74 are retracted. At that time, light 175 will be illuminated as will be described hereinafter.

Figure 8:
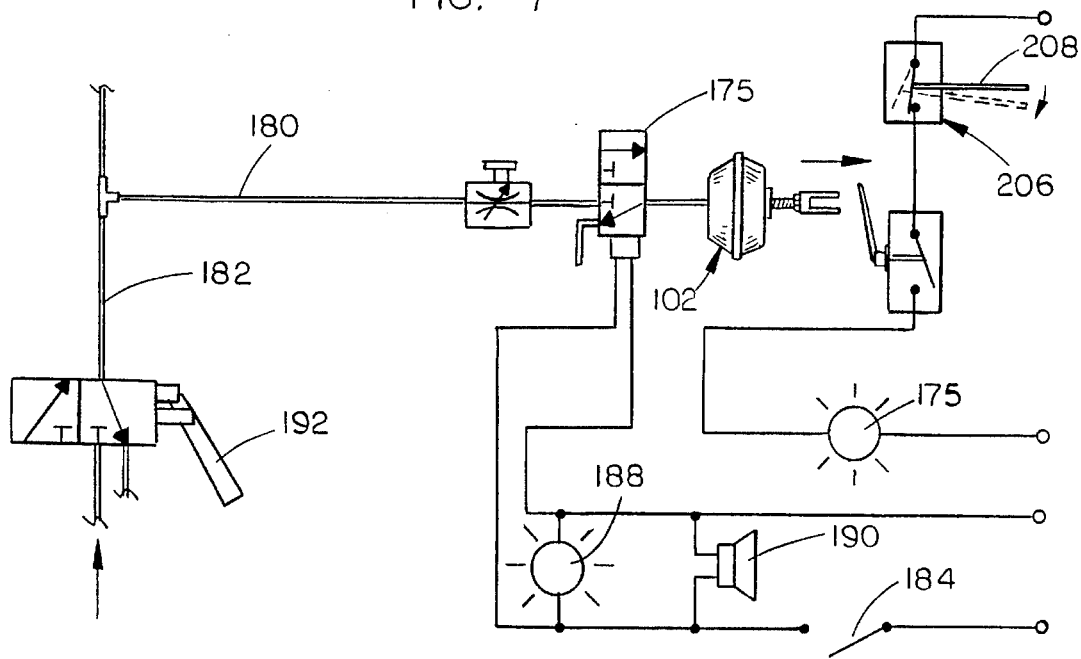
FIG. 8 is a schematic of the circuitry for the air powered actuator of this invention.

An electrically operated air valve 174 is operatively connected to the air inlet 108 of the cylinder 102 and has an exhaust port 176 extending downwardly therefrom. An air regulator 178 is provided on the inlet side of the air valve 174 and is connected to an air line 180 which is connected to the air line 182 as illustrated in FIG. 8.

Air valve 174 is controlled by a switch 184 located on the dash in the operator's cab. When the switch 184 is closed, the air valve 174 is actuated, as is the indicator light 188, to indicate to the operator that the system is being operated to retract the locking pins 74. An audible signal device 190 is also actuated when the switch 184 is closed to further indicate to the operator that air is being supplied to the air actuator. The control or supply of air to regulator 178 and valve 174 is controlled by the air brake control for the brakes on the rear tandem axle. As seen in FIG. 8, the brake control lever 192 is actuated to supply air to the brakes on the rear tandem axle to lock the rear tandem axle in position. At the same time, air is supplied to the inlet side of valve 174. Air is supplied from the valve 174 to cylinder 102 when the normally open switch 184 is closed.

In operation, to summarize somewhat, when it is desired to adjust the suspension of the rear tandem axle of the trailer with respect to the body of the trailer, lever 192 is actuated to supply air to the brakes on the rear tandem axle to lock the rear tandem axle in position. At the same time, air is supplied to the valve 174. The closing of the switch 184 causes the valve 174 to be opened so that air is supplied to the inlet side of the cylinder 102. At this time, the indicator light 188 and the audible signal device 190 are actuated to indicate to the operator that air is being supplied to the cylinder 102.

When valve 174 is opened, air is supplied to cylinder 102 so that rod 104 is extended therefrom. As rod 104 is extended from the cylinder 102, pin 130 is moved laterally outwardly in the slots 122 and 124. The outward movement of the pin 130 in the slots 122 and 124 causes the link 140 to be pivoted which in turn causes the bracket members 148 and 150 to be pivoted which causes a shaft 90 to be rotated from the position of FIG. 5 to the position of FIG. 6. The rotational movement of the shaft 90 causes the plate 94 to be rotated which causes the links 92 to retract the locking pins 74.

In the event that the locking pins 74 are stuck in their respective openings, due to some binding force thereon, the pin 30 will not be able to move outwardly in the slots 122 and 124. Since pin 30 is unable to move outwardly in the slots 122 and 124, due to the binding action, the microswitch 164 will remain open which will prevent the light 175 from being illuminated. Since the operator is able to detect that the light 175 is not illuminated, he or she will know that the locking pins have not been fully retracted. The operator then jiggles or jogs the trailer as previously described to loosen the binding on the locking pins. When the locking pins 74 have been completely retracted, pin 130 will be in the position illustrated in FIG. 6 which will cause switch arm 172 to be deflected thereby closing switch 164 to illuminate light 174 which provides a signal to the driver that the locking pins 74 have been retracted.

When the locking pins 74 have been retracted and the frame of the trailer body moved with respect to the slider, air valve 174 is de-energized by switch 184 which causes the air in the cylinder 102 to be exhausted through the valve 174 by means of the exhaust port 176. The springs 84 on the locking pins 74 then cause the locking pins 74 to move from their retracted positions to their extended positions.

When the locking pins 74 have been properly positioned in their extended and locked position, the operator then moves the lever 192 to release the brakes on the trailer so that the trailer may be operated in its normal condition.

Although the structure described hereinabove solves the problems associated with the prior art, it has been found that an additional advantage may be achieved in the adjustment of the suspension system relative to the trailer body if the operator is somehow able to ascertain the amount of movement which has been accomplished during the adjustment process. For example, if the locking pins are in a particular set of openings, the operator knows that the movement of those locking pins from that set of openings to the next adjacent set of openings will change the weight distribution of the trailer a certain amount, for example 250 pounds. Thus, if the operator determines that he/she must make a weight distribution adjustment of 750 pounds, the operator knows that the trailer body must be moved three openings forwardly or rearwardly, depending upon whether the operator desires to shift additional weight from the trailer to the tractor or vice versa.

Heretofore, prior to the instant invention, once the locking pins have been retracted, the operator either drives the trailer forwardly or rearwardly with respect to the suspension, which is braked against movement, until the operator believes that the proper amount of relative movement has been achieved. The operator must then exit the cab and make a visual inspection of the locking pins to see if they are in alignment with the proper openings in the side rails. Quite often, the locking pins are not in proper alignment which requires that the operator return to the cab to attempt to move the trailer body into the proper position relative to the suspension. The operator must then again exit the cab and make the necessary visual inspection. This process may be repeated several times until the proper alignment is achieved.

To solve the above problem, a position sensing apparatus has been provided which is generally referred to by the reference numeral 200. Apparatus 200 includes an elongated support 202 which is secured to the underside of at least a pair of the cross frame members 14 so that its longitudinal axis is aligned with the longitudinal axis of the trailer. Support 202 is provided with a plurality of horizontally spaced-apart shoulders or lugs 204 mounted thereon which extend downwardly therefrom. The spacing between the shoulders 204 will correspond to the spacing between the openings 82. A conventional, normally closed microswitch 206 is mounted on the frame 36 of slider 16 for movement therewith. Switch arm 208 extends from microswitch 206 beneath support 202 and between the shoulders 204.

Figure 9:
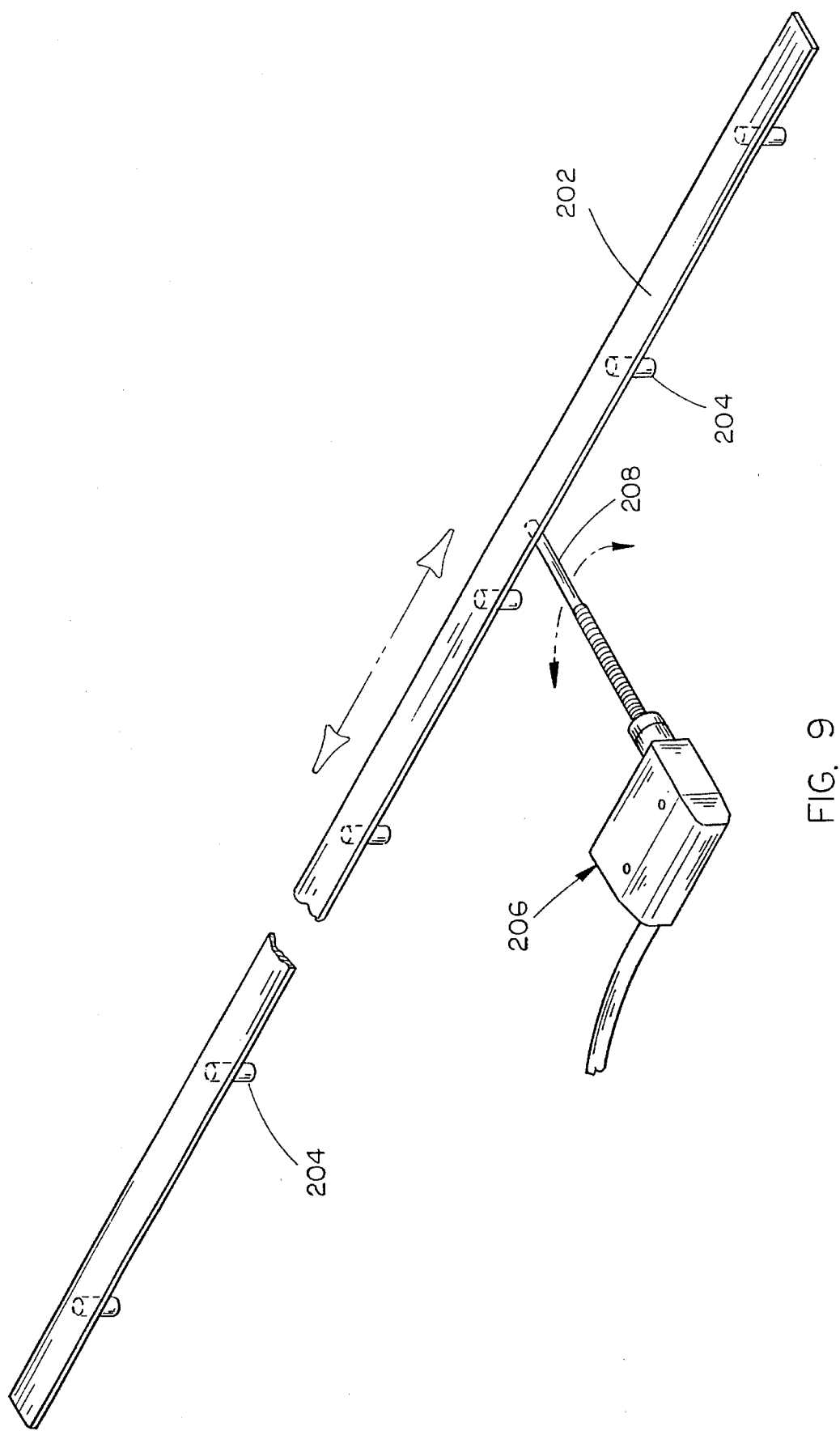
FIG. 9 is a perspective view of the mechanism which successively deactivates a signal light to indicate movement of the trailer body with respect to the trailer suspension.

When one of the shoulders 204 engages the switch arm 208, as the trailer body is moved with respect to the suspension 18, switch arm 208 is deflected to open microswitch 206 as illustrated by broken lines in FIG. 9.

As seen in FIG. 8, normally closed microswitch 206 is operatively electrically connected to microswitch 164. When the locking pins 74 are in their respective openings, microswitch 206 is closed so that electrical current is supplied to the "hot" side of microswitch 164. When the locking pins 74 have moved to their retracted positions, light 175 is illuminated which indicates that the locking pins 74 are fully retracted as described hereinabove. The operator then slowly moves the trailer body with respect to the slider 16. Each time one of the shoulders 204 engages switch arm 208, which means that the trailer has been moved a distance corresponding to the distance between a pair of openings 80, microswitch 206 is opened which interrupts the electrical circuit to microswitch 164 thereby causing light 175 to be deactivated. The deactivation of the light 175 is a signal to the operator that the trailer has been moved a distance corresponding to the distance between a pair of openings 80 as described. The continued movement of the trailer body, with respect to suspension 18 with cause the light 175 to again be illuminated since switch arm 208 will disengage from the shoulder 204.

Thus, if the operator has determined that the trailer must be adjusted four openings 80 from the previous position, the operator will move the trailer body; with respect to the suspension 18, until he/she has observed the deactivation of light 175 a total of four times. The locking pins 74 may then be extended to their desired locked position.

The successive deactivation of the light 175 by the microswitch 206 provides a convenient means for the operator to readily adjust the trailer body-suspension without the necessity of making one or more trips from the cab to the rear of the trailer to ascertain whether the trailer has been moved to the desired position with respect to the suspension. Thus it can be seen that the invention accomplishes at least all of its stated objectives.

I claim:

1. A slider for adjustment of the suspension of a vehicle longitudinally with respect to the body of the vehicle, the slider comprising a pair of side rails adapted to be secured to the left and right sides of the body in a fixed position extending longitudinally of the body, each of said side rails having a plurality of horizontally spaced openings formed therein, a frame adapted to carry the suspension comprising left and right slide members slidable longitudinally of the body on the side rails, at least one locking pin operatively mounted on each of said slide members for longitudinal movement therewith relative to said side rails, said locking pins being retractable for permitting adjustment of the frame to a selected position of adjustment and extensible into one of said openings in said side rails for locking the frame in a selected position of adjustment, actuator means for retracting said locking pins including a movable actuator movable between a first and second position and a linkage interconnecting said movable actuator and said pins for conjoint movement of the pins between extended and retracted positions, the improvement comprising:

sensing means for sensing the relative longitudinal movement of said vehicle body with respect to said vehicle suspension;

a signal means operatively connected to said sensing means, said signal means being operated to provide a signal to the vehicle operator that the vehicle body has been moved a predetermined amount with respect to said vehicle suspension;

a normally open first switch in the path of said movable actuator which is closed by said movable actuator when said movable actuator is moved from its said first position to its said second position;

said signal means comprising a light operatively connected to said first switch which is normally illuminated when said movable actuator has been moved to its said second position and said locking pins have been moved to their retracted positions.

2. The slider of claim 1 wherein said light is positioned at one side of said vehicle body.

3. The slider of claim 1 wherein said sensing means also comprises a second switch which is operated as said vehicle body is successively moved, in predetermined amounts, relative to said vehicle suspension.

4. The slider of claim 3 wherein said second switch is operated each time one of the retracted locking pins moves into alignment with one of said openings in the associated side rail.

5. The slider of claim 1 wherein said sensing means further comprises an elongated member secured to said vehicle body for movement therewith; said elongated member having its longitudinal axis disposed in alignment with the longitudinal axis of said vehicle body; said elongated member having a plurality of horizontally spaced-apart shoulders provided thereon which are spaced corresponding to the spacing between said openings in said side rails; a second switch mounted on said slider for movement therewith and having a switch arm extending therefrom which is successively engaged and moved by said shoulders as said vehicle body is longitudinally adjusted relative to said vehicle suspension; said second switch being connected to said light to control the operation of said light each time said switch arm is moved by its engagement with one of said shoulders as said vehicle body is moved relative to said vehicle suspension.

6. The slider of claim 5 wherein said second switch interrupts the electrical circuit to said light to deactivate said light each time said locking pins move into alignment with one of said openings as said vehicle body is moved with respect to said vehicle suspension.

* * * * *